United States Patent
Xiong et al.

(10) Patent No.: US 10,972,974 B2
(45) Date of Patent: Apr. 6, 2021

(54) METHODS AND APPARATUSES FOR MACHINE-TYPE COMMUNICATIONS IN CELLULAR NETWORKS

(71) Applicant: INTEL IP CORPORATION, Santa Clara, CA (US)

(72) Inventors: Gang Xiong, Beaverton, OR (US); Debdeep Chatterjee, Mountain View, CA (US); Seunghee Han, San Jose, CA (US); Hwan-Joon Kwon, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/551,885

(22) PCT Filed: Sep. 4, 2015

(86) PCT No.: PCT/US2015/048682
§ 371 (c)(1),
(2) Date: Aug. 17, 2017

(87) PCT Pub. No.: WO2016/167828
PCT Pub. Date: Oct. 20, 2016

(65) Prior Publication Data
US 2018/0041957 A1    Feb. 8, 2018

Related U.S. Application Data

(60) Provisional application No. 62/147,985, filed on Apr. 15, 2015.

(51) Int. Cl.
*H04W 52/02* (2009.01)
*H04W 72/12* (2009.01)
(Continued)

(52) U.S. Cl.
CPC ... *H04W 52/0216* (2013.01); *H04W 52/0219* (2013.01); *H04W 72/1268* (2013.01);
(Continued)

(58) Field of Classification Search
CPC . H04W 48/16; H04W 48/18; H04W 72/0453; H04W 88/06; H04W 72/02;
(Continued)

(56) References Cited

U.S. PATENT DOCUMENTS

2011/0274040 A1   11/2011  Pani et al.
2012/0184206 A1   7/2012   Kim et al.
(Continued)

OTHER PUBLICATIONS

International Search Report and Written Opinion dated Jan. 4, 2016 from International Application No. PCT/US2015/048682, 13 pages.
(Continued)

*Primary Examiner* — Dady Chery
(74) *Attorney, Agent, or Firm* — Eschweiler & Potashnik, LLC

(57) ABSTRACT

Embodiments of the present disclosure describe systems, devices, and methods for grantless uplink transmissions in cellular networks. Various embodiments may include a detailed physical layer design for grantless uplink transmissions. In particular, various embodiments may include, for grantless uplink transmissions, enhanced mechanisms; transmission schemes; repeated transmissions; demodulation reference signal (DM-RS); power control mechanisms; and interference control mechanisms. Other embodiments may be described or claimed.

24 Claims, 7 Drawing Sheets

(51) Int. Cl.
| | |
|---|---|
| *H04W 74/08* | (2009.01) |
| *H04W 76/28* | (2018.01) |
| *H04W 76/14* | (2018.01) |
| *H04W 72/04* | (2009.01) |
| *H04W 4/70* | (2018.01) |
| *H04L 1/00* | (2006.01) |

(52) U.S. Cl.
CPC ....... *H04W 74/0883* (2013.01); *H04W 76/14* (2018.02); *H04W 76/28* (2018.02); *H04L 1/004* (2013.01); *H04W 4/70* (2018.02); *H04W 72/0453* (2013.01); *Y02D 70/00* (2018.01); *Y02D 70/10* (2018.01); *Y02D 70/12* (2018.01); *Y02D 70/122* (2018.01); *Y02D 70/124* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/20* (2018.01); *Y02D 70/21* (2018.01)

(58) Field of Classification Search
CPC ......... H04W 52/0216; H04W 52/0219; H04W 76/14; H04W 76/28; H04W 72/1268; H04W 74/0883; H04W 4/70; H04W 72/045; H04M 1/00; Y02D 70/1242; Y02D 70/1264; Y02D 70/144; Y02D 70/142; Y02D 70/12; Y02D 70/1262; Y02D 70/20; Y02D 70/10; Y02D 70/122; Y02D 70/00; Y02D 70/21; Y02D 70/124; H04L 1/004

See application file for complete search history.

(56) References Cited

U.S. PATENT DOCUMENTS

| | | |
|---|---|---|
| 2013/0034071 A1 | 2/2013 | Lee et al. |
| 2017/0048811 A1* | 2/2017 | Seo .................... H04W 56/002 |

OTHER PUBLICATIONS

3GPP, "Technical Specification Group Radio Access Network; Evolved Universal Terrestrial Radio Access (E-UTRA); Multiplexing and channel, coding (Release 15)," 3GPP TS 36.212 V15.1.0 (Mar. 2018), Apr. 2, 2018, 5G, 234 pages.

3GPP, "Technical Specification Group Radio Access Network; Evolved Universal Terrestrial Radio Access (E-UTRA); Physical layer procedures (Release 15)," 3GPP TS 36.213 V15.1.0 (Mar. 2018), 5G, Apr. 3, 2018, 501 pages.

3GPP, "Technical Specification Group Radio Access Network; Evolved Universal Terrestrial Radio Access (E-UTRA); Physical channels and modulation (Release 15)," 3GPP TS 36.211 V15.1.0 (Mar. 2018), 5G, Apr. 2, 2018, 221 pages.

European Patent Office—Article 94(3) dated Dec. 6, 2018 from European Patent Application No. 15767382.3, 7 pages.

* cited by examiner

METHODS AND APPARATUSES FOR MACHINE-TYPE COMMUNICATIONS IN CELLULAR NETWORKS

CROSS-REFERENCE TO RELATED APPLICATION

This application is a national phase entry under 35 U.S.C. § 371 of International Application No. PCT/US2015/048682, filed Sep. 4, 2015, entitled "METHODS AND APPARATUSES FOR MACHINE-TYPE COMMUNICATIONS IN CELLULAR NETWORKS", which designated, among the various States, the United States of America, which claims priority to U.S. Patent Application No. 62/147,985, filed Apr. 15, 2015, entitled "Physical Layer Details and Protocol Design for Connection-Less Transmissions of Small Data Packets for Machine-Type Communication Uplink," the disclosures of which are hereby incorporated by reference in their entireties.

FIELD

Embodiments of the present disclosure generally relate to the field of wireless communication, and more particularly, to methods and apparatuses for machine-type communications in cellular networks.

BACKGROUND

Machine-type communication (MTC) is a promising and emerging technology to enable a ubiquitous computing environment towards the concept of "Internet of Things (IoT)." Potential MTC-based applications include smart metering, healthcare monitoring, remote security surveillance, intelligent transportation systems, etc. Existing mobile broadband networks were designed to optimize performance mainly for human types of communications and thus are not designed or optimized to address the MTC-related issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
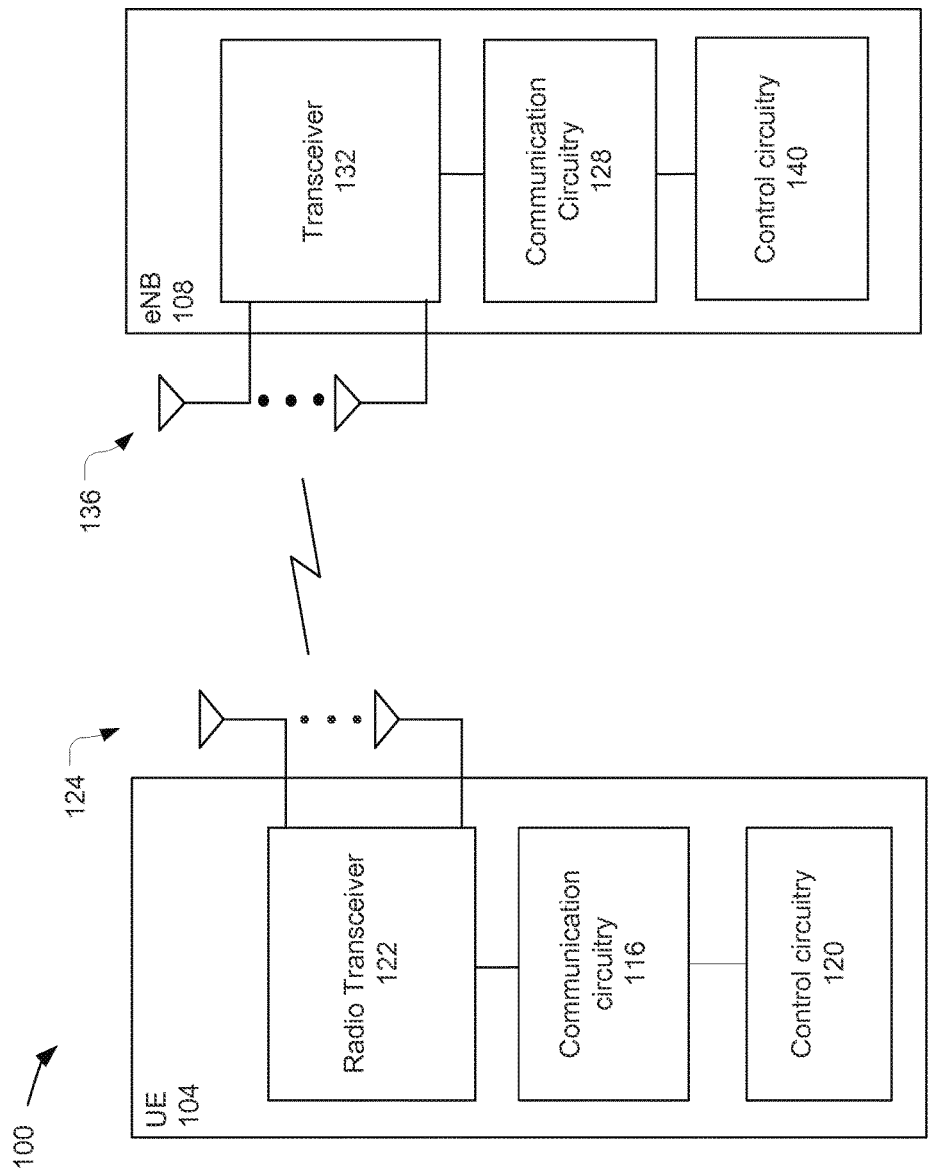
FIG. 1 schematically illustrates a wireless communication environment in accordance with various embodiments.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise.

The phrases "A or B," "A/B," and "A and/or B" mean (A), (B), or (A and B).

As used herein, the term "circuitry" refers to, is part of, or includes hardware components such as an application specific integrated circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. In some embodiments, the circuitry may be implemented in, or functions associated with the circuitry may be implemented by, one or more software or firmware modules. In some embodiments, circuitry may include logic, at least partially operable in hardware, to perform the described operations.

Illustrative embodiments of the present disclosure include, but are not limited to, methods, systems, computer-readable media, and apparatuses that may enable MTC services and applications and support the design and development of a new type of MTC device that can be seamlessly integrated into current and next generation mobile broadband networks such as Long Term Evolution (LTE) and LTE-Advanced networks. As used herein, a reference to LTE may include LTE or LTE-A unless otherwise indicated.

To reduce the cost and power consumption of MTC operation, it may be beneficial to reduce the system bandwidth to, for example, 200 KHz, which corresponds to roughly a single physical resource block (PRB) in existing LTE design. This "cellular IoT" could potentially operate in re-farmed global system for mobile communications (GSM) spectrum, within the guard bands of an LTE carrier, or within a dedicated spectrum.

For smart metering types of MTC applications, it is expected that MTC devices may communicate with an evolved node base station (eNB) in infrequent small burst transmissions. For instance, an MTC device may report water or electricity usage once per 6 hours or once per day. If MTC devices follow the normal procedure to transmit the data in the uplink, they may need to first acquire uplink synchronization by transmitting a physical random access channel (PRACH) signal and subsequently receive the uplink grant from eNB. Given the fact that only a small amount of data is transmitted in the uplink for typical MTC applications, the current design is not efficient in terms of scalability to support a massive number of MTC devices as envisioned in the near future due to substantial signaling overhead.

FIG. 1 schematically illustrates a wireless communication environment 100 in accordance with various embodiments. The environment 100 may include a user equipment (UE) 104 and an eNB 108.

The eNB 108 may be an access node of a 3rd Generation Partnership Project (3GPP) LTE network. In particular, the eNB 108 may be part of a radio access network (RAN) of the LTE network, such as an evolved universal terrestrial radio access network (E-UTRAN). While embodiments of the present disclosure are described with respect to LTE networks, similar concepts may also be applicable to other networks, for example, universal mobile telecommunications system (UMTS) networks, GSM networks, etc.

The E-UTRAN may be coupled with components of a core network, for example, an Evolved Packet Core (EPC) that performs various management and control functions of the LTE network and further provides a communication interface between various RANs and other networks.

The UE 104 may be any type of computing device equipped with wireless communication circuitry and adapted to communicate through a RAN according to, for example, one or more 3GPP Technical Specifications. The UE 104 may include, but is not limited to, a phone, a computer, a sensor, or any other device that is configured for wireless communication through a RAN. In various embodiments, the UE 104 may be a UE primarily designed for MTC and may also be referred to as an MTC UE.

The UE 104 may include communication circuitry 116, control circuitry 120, radio transceiver 122, and one or more antennas 124.

Communication circuitry 116 may interface with the radio transceiver 122 to receive radio frequency (RF) signals from and/or send RF signals to one or more components, for example, eNB 108, over an air interface via the one or more antennas 124. The air interface between the UE 104 and the eNB 108 may be referred to as a Uu interface in 3GPP Technical Specifications. In various embodiments, the communication circuitry 116 may use evolved universal terrestrial radio access (E-UTRA) protocols for communications over the air interface. The communication circuitry 116 may use orthogonal frequency division multiple access (OFDMA) for downlink communications and single carrier-frequency division multiple access (SC-FDMA) for uplink communications on the Uu interface.

The communication circuitry 116 may include signal-construction circuitry including, but not limited to, an encoder to encode input data, and a modulator to modulate a carrier signal to include the encoded input data to be transmitted. The communication circuitry 116 may further include signal-deconstruction circuitry including, but not limited to, a demodulator to provide encoded data from a modulated carrier signal, and a decoder to provide data from encoded data.

The radio transceiver 122 may provide for the transmission and reception of the RF signals. The radio transceiver 122 may have RF transmit circuitry such as, but not limited to, an up-converter to convert baseband signals to radio-frequency signals, and a power amplifier (PA) to amplify the RF signals for transmission. The radio transceiver 122 may further have RF receive circuitry such as, but not limited to, a low-noise amplifier to amplify a received RF signal, a filter to filter a received RF signal, and a downconverter to convert an RF signal to a baseband signal.

The control circuitry 120 may be coupled to communication circuitry 116, and may be configured to perform higher layer operations, for example, operations at layers in a communication protocol stack that are higher than layers of the communication protocol stack that perform the operations of the communication circuitry 116 for the radio transceiver 122.

In some embodiments, the communication circuitry 116 and the control circuitry 120 may, collectively, provide the majority or all of the operations related to the communication protocol stack. The communication circuitry 116 and the control circuitry 120 may include, or be a part of, baseband circuitry (for example, a baseband chipset), a PC card, a connect card, a mobile broadband modem, etc.

The eNB 108 may include communication circuitry 128 to interface with transceiver 132 to communicate over the air interface to, for example, receive uplink RF signals from UE 104 via one or more antennas 136 and transmit downlink RF signals to UE 104 via the one or more antennas 136. In some embodiments, the communication circuitry 128 may have signal-construction circuitry and signal-deconstruction circuitry that complement the corresponding circuitry in communication circuitry 116. Similarly, the transceiver 132 may include RF transmit circuitry and RF receive circuitry that complement the corresponding circuitry in radio transceiver 122.

The eNB 108 may also include control circuitry 140 coupled with communication circuitry 128. The control circuitry 140 may be configured to perform higher layer operations to control aspects of wireless communications in the cell provided by the eNB 108.

In addition to communication over the air interface, the components of the UE 104 and eNB 108 may include circuitry to communicate over one or more additional wired or wireless interfaces. For example, in some embodiments, the transceiver 132 may include an Ethernet interface to support S1-AP signaling over Ethernet networks such as, but not limited to, fiber-optic gigabit and 10 Gigabit Ethernet, to provide the S1-MME interface.

In instances in which the UE 104 is an MTC UE, it may utilize uplink transmission procedures specifically designed to reduce signaling overhead and save network resources for MTC devices. In particular, the UE 104 may use a connectionless uplink transmission that significantly reduces the signaling overhead by enabling asynchronous uplink transmission and introducing a random access scheme for uplink transmission.

A connectionless uplink transmission, as described herein, does not require the UE 104 to send a specific request for resources and receive a corresponding grant of the requested resources. Thus, a connectionless uplink transmission may also be referred to as a grantless uplink transmission.

Figure 2:
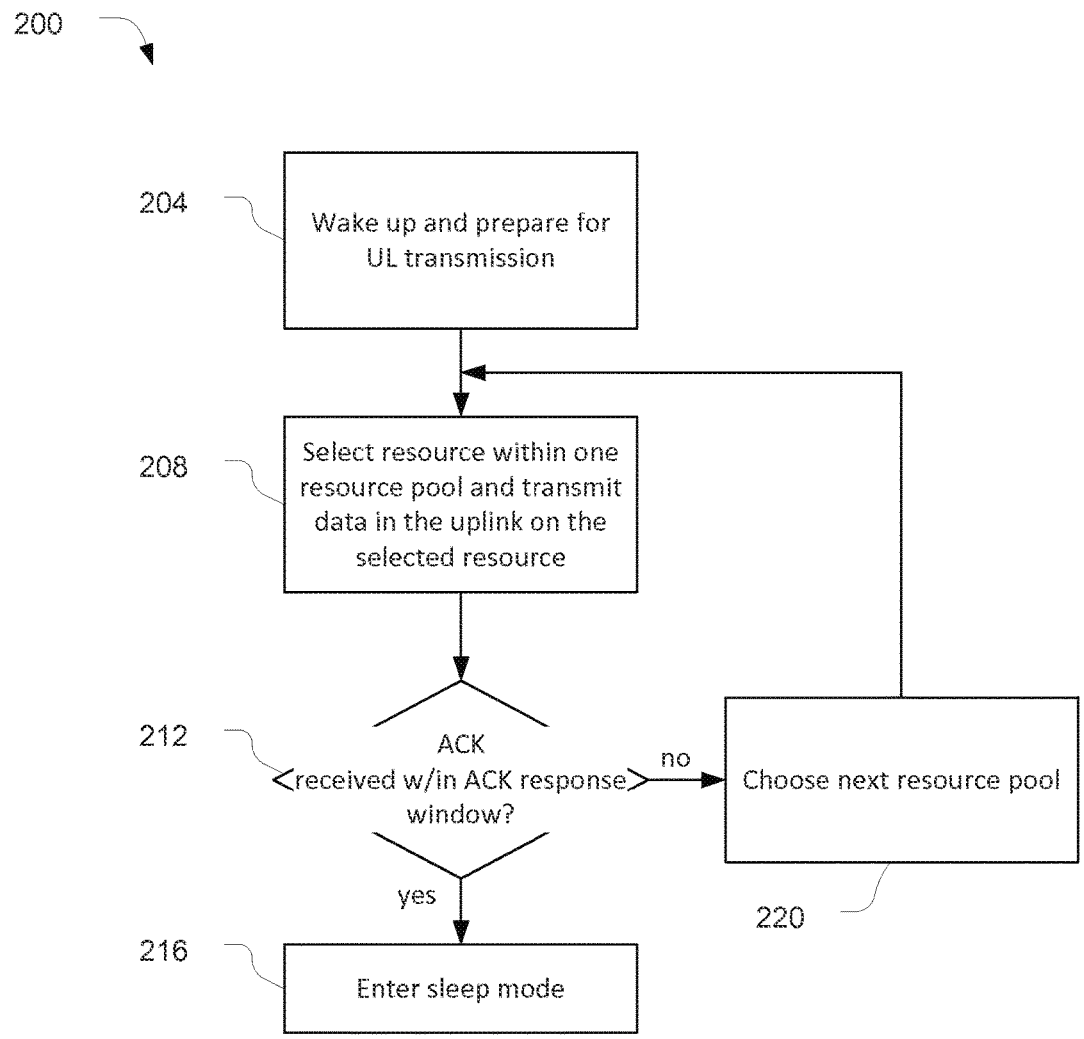
FIG. 2 is a flowchart describing operations of a grantless uplink transmission in accordance with various embodiments.

FIG. 2 is a flowchart 200 describing operations of a grantless uplink transmission in accordance with some embodiments. The operations described in FIG. 2 may be performed by the UE 104 in accordance with some embodiments. The operations described in the flowchart 200 may be performed by various components of the UE 104 such as, but not limited to, communication circuitry 116 or control circuitry 120.

At 204, the UE 104 may wake up and prepare for uplink (UL) transmission. To do so, the UE 104 may acquire downlink (DL) synchronization signals and obtain system information from one or more system information blocks (SIBs).

At 208, the UE 104 may select a transmission resource within a resource pool, which is a distinct subset of the available uplink resources, and transmit data in the uplink on the selected resource. In some embodiments, the UE 104 may randomly select one transmission resource within the resource pool. As used herein, a transmission resource may include one or more physical resource blocks (PRBs) or subcarriers in the frequency domain or one or more transmission time intervals (TTIs) in the time domain.

The resource pool may be one of a plurality of periodically occurring resource pools that are configured by the network in the uplink bands (in Frequency Division Duplex (FDD) systems) or uplink subframes (in Time Division Duplex (TDD) systems). The resource pools may be non-UE-specific resource pools. That is, the resource pools may not be reserved for, or otherwise dedicated to, any particular UE.

At 212, the UE 104 may determine whether an acknowledgment is received within an acknowledgment response window. The acknowledgment may be transmitted from the eNB 108 and may indicate that the data has been successfully received by the eNB 108.

If, at 212, it is determined that an acknowledgment has been received within the acknowledgment response window, the UE 104 may, at 216, enter a sleep mode.

If, at 212, it is determined that an acknowledgment has not been received within the acknowledgment response window, the UE 104 may, at 220, choose another uplink resource pool for retransmission of the MTC data. In some embodiments, the next uplink resource pool may be a $K^{th}$ uplink resource pool, where K is a predetermined integer. In other embodiments, the UE 104 may select the next uplink resource pool based on a random back-off procedure performed by the UE 104. After the next resource pool has been chosen, the operation may go back to block 208 and repeat.

Embodiments described herein disclose a detailed physical layer design for grantless uplink transmissions, such as those described in FIG. 2, for MTC devices (and devices communicating with MTC devices, e.g., eNBs) in wireless systems. In particular, embodiments describe enhanced activation mechanisms; transmission schemes (including, for example, data formats, channel coding, rate matching, scrambling, indication of modulation and coding schemes (MCSs) and payload size, etc.); repeated transmissions; demodulation reference signal (DMRS); power control mechanisms; and interference control mechanisms. Embodiments described herein may be used with MTC UEs that have a 1.4 Megahertz (MHz) system bandwidth (e.g., LTE-A Release 13 MTC UEs) and those that have narrowband, for example, system bandwidths of 200 kilohertz (KHz), 400 KHz, 600 KHz, etc.

In many cases, the UE 104 may send transmissions with relatively small payloads. However, in some cases, the payload size may be relatively larger or may be associated with a relatively large size variance. To further enhance the performance of grantless uplink transmissions when the UE 104 has a larger payload size or unpredictable payload size for transmission, activation and deactivation mechanisms are described. More specifically, the UE 104 may send an activation message for a periodic uplink (UL) transmission (without UL grant, or scheduling request). Upon receiving the activation message, the eNB may activate the resource pool and send the UE 104 an activation response message. Once the UE 104 receives the activation response message, the UE 104 can transmit the consecutive (or periodic) data in the resource pool. This operation can be paused/stopped/terminated by the UE 104 sending a deactivation message.

In some embodiments, the activation message may be transmitted through a scheduling request (SR) channel in LTE, for example, the physical uplink control channel (PUCCH), using PUCCH Format 1 or the like. The data/reference signal (RS) parts of the PUCCH format 1 may be modulated by a signature to provide an indication of whether the scheduling request applies to a grantless transmission. For example, the data/RS part of the PUCCH format 1 may be modulated by +1 to indicate a normal scheduling request for a grant-based transmission (for which the UE 104 may need to wait for a specific resource allocation from the eNB) and may be modulated by −1 to indicate a request for a grantless transmission (for which the UE 104 may not need to wait for a resource allocation and may just use resources in the resource pool). Note that this mechanism can allow UEs to control the payload size. For example, the UE 104 may send a normal scheduling request if it needs a resource to accommodate a relatively larger payload size.

Figure 3:
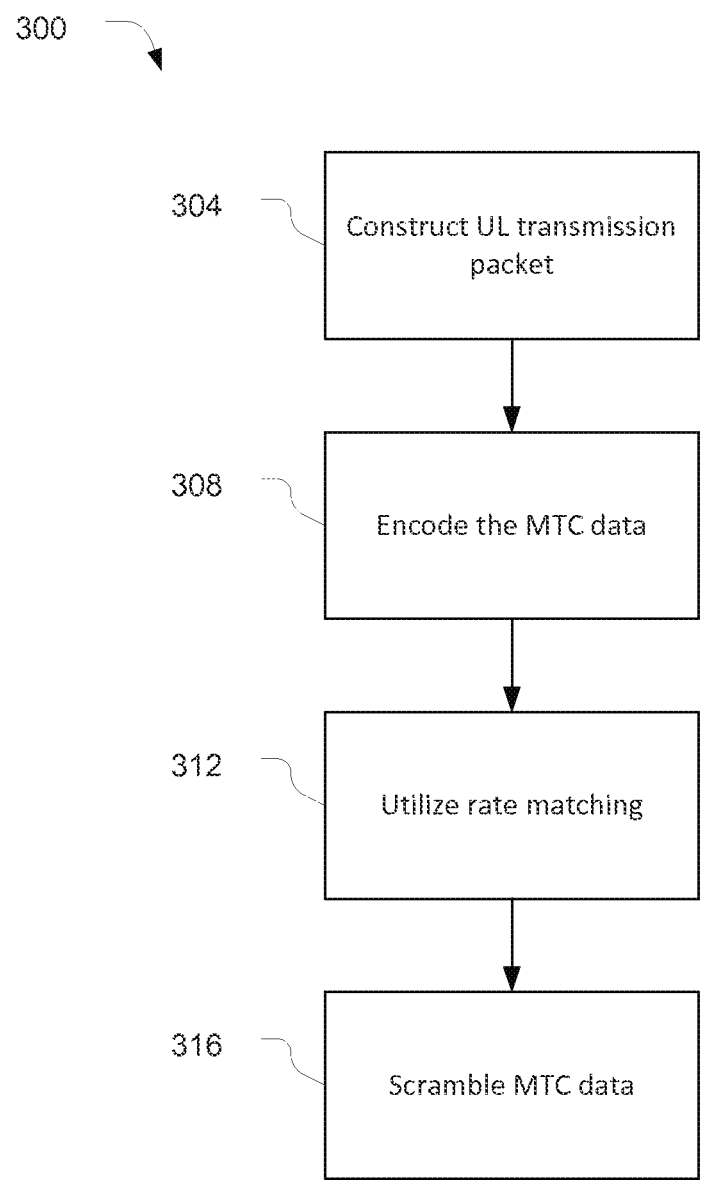
FIG. 3 is a flowchart describing transmission operations in accordance with various embodiments.

Various transmission schemes are described herein to increase the efficiency of grantless uplink transmissions. FIG. 3 illustrates a flowchart 300 that includes transmission operations that may be performed by the UE 104 in accordance with various embodiments. The operations described in the flowchart 300 may be performed by various components of the UE 104 such as, but not limited to, communication circuitry 116 or control circuitry 120.

At 304, the UE 104 may construct an uplink transmission packet that may be transmitted in a grantless uplink transmission. A data format for the uplink transmission packet may include a header field followed by a payload field followed by a cyclic redundancy check (CRC) field. The UE 104 may include a UE identifier (UE ID) in the header field to allow the eNB 108 to identify the UE 104. In some embodiments, the UE ID may be based on an international mobile subscriber identifier (IMSI), cell radio network temporary identifier (C-RNTI), or other identifier.

In various embodiments, the CRC may include, for example, 8, 16, or 24 parity check bits calculated based on the payload and header. The CRC may be appended to the payload. As specified in section 5.1.1 in 3GPP TS 36.212 v12.4.0 (Mar. 26, 2015), for example, one of the generator polynomials $g_{CRC8}(D)$, $g_{CRC16}(D)$, $g_{CRC24A}(D)$ and $g_{CRC24B}(D)$ may be adopted for the grantless uplink transmission.

At 308, the UE 104 may encode the uplink transmission packet according to the selected channel coding scheme. For grantless uplink transmissions, either tail-biting convolutional codes (TBCC) or turbo codes (TC) in the LTE specification can be adopted for channel coding. As TBCC outperforms TC when the payload size is relatively small, it may be more beneficial to reuse the existing TBCC for grantless uplink transmissions.

At 312, the UE 104 may utilize rate matching to fill out the available resource elements (REs) for one transmission resource of the resource pool used for the grantless uplink transmission.

At 316, the UE 104 may scramble the transmission packet in order to randomize the interference. The UE 104 may scramble the transmission packet using a scrambling seed. In the existing LTE specification, a scrambling seed for physical uplink shared channel (PUSCH) transmission is defined as the following function of UE radio network temporary identifier (RNTI), $$c_{init}=n_{RNTI}\cdot 2^{14}+q\cdot 2^{13}+\lfloor n_s/2 \rfloor \cdot 2^9+N_{ID}^{cell},$$

where $n_{RNTI}$ is a UE radio network temporary identifier (RNTI), q is a codeword index, $N_{ID}^{cell}$ is a cell ID, and $n_S$ is a slot index. Typically, only 1 codeword is considered for MTC application. In such cases, q may be set to zero.

For grantless uplink transmissions, UE RNTI may be assumed not to be known at the eNB 108. In order to simplify the receiver design, several options for the initialization of the scrambling sequence can be considered as follows.

In some embodiments, the scrambling sequence can be initialized with $$c_{init}=N_{ID}^{cell}.$$

In some embodiments, the scrambling seed can be defined as a function of cell ID and slot/subframe index:

$$c_{init}=f(N_{ID}^{cell},n_S).$$

In one example, the scrambling seed can be given as $$c_{init}=\lfloor n_s/2 \rfloor \cdot 2^9 + N_{ID}^{cell}.$$

In some embodiments, a fixed or configured UE RNTI can be included in the scrambling seed generation. For example, the scrambling seed can be given as $$c_{init}=n_{RNTI} \cdot 2^{14}+\lfloor n_s/2 \rfloor \cdot 2^9 + N_{ID}^{cell},$$

In some embodiments, the eNB 108 may configure the UE RNTI by sending one or more configuration parameters to the UE 104. The configuration parameters may be transmitted using higher layer signaling such as, for example, radio resource control (RRC) signaling.

In one example, the UE RNTI can be associated with the resource pool or a specific portion of the resource pool. The associations between the resource pool/portions and the UE RNTI may be fixed or configured by, for example, the eNB 108.

In some embodiments, the scrambling seed can be defined as a function of cell ID, slot/subframe index, and the lowest physical resource block (PRB) index corresponding to the physical resources on which the UE 104 transmits the MTC data in the uplink. For example, the scrambling seed can be given as $$c_{init}=f(N_{ID}^{cell},n_S,n_{PRB}),$$

where $n_{PRB}$ is the lowest PRB index corresponding to the physical resources on which the UE 104 transmits the MTC data in the uplink.

In some embodiments, the scrambling seed can be given as $$c_{init}=c \cdot n_{PRB}+\lfloor n_s/2 \rfloor \cdot 2^9 + N_{ID}^{cell},$$

where c is a constant and can be fixed or configured by higher layers. For instance, in some embodiments, $c=2^{14}$.

Various embodiments describe how the UE 104 may provide an indication of modulation and coding scheme (MCS) and payload size to the eNB 108.

In some embodiments, MCS and payload size may be predefined for each transmission. The payload size of the UL transmissions may differ depending on the specific application or services that generate the data. In order to allow efficient usage of the channel for different payload sizes, multiple subregions (or "portions") can be defined within one grantless uplink transmission resource pool.

More specifically, and in accordance with some embodiments, the grantless uplink transmission resource pool can be further divided into multiple resource sub-regions, with each subregion corresponding to a transmission with specific payload size, MCS, etc. For example, individual subregions of a resource pool may correspond to individual payload ranges. The correspondence between the subregions and the specific payload size, MCS, etc. can be fixed or configured by higher layers. In some embodiments, the eNB 108 may configure this correspondence via broadcast signaling, for example, through a SIB, or unicast signaling, for example, through UE-specific dedicated RRC signaling.

These resource subregions can be multiplexed in either a time division multiplex (TDM), a frequency division multiplex (FDM) manner, or a combination of TDM and FDM.

Figure 4:
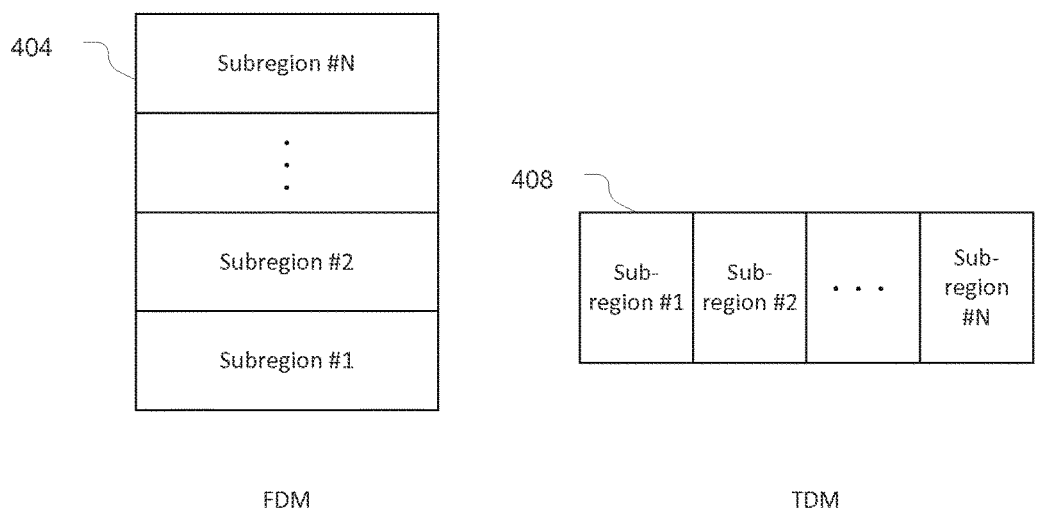
FIG. 4 illustrates multiplexed subregions in accordance with various embodiments.

FIG. 4 illustrates multiplexed subregions in accordance with some embodiments. In particular, a grantless resource pool 404 is shown as an example of multiplexing multiple subregions in the FDM manner, and grantless resource pool 408 is shown as an example of multiplexing multiple sub-regions in the TDM manner. In general, subregion k (k=1, . . . , N) comprises $N_{fk}$ PRBs or subcarriers in the frequency domain and $N_{tk}$ TTIs in the time domain; and each uplink transmission resource pool spans $M_{fk}$ PRBs or subcarriers in the frequency domain and $M_{tk}$ TTIs in the time domain. In one example, for a relatively small payload size, each uplink transmission resource pool may occupy 1 PRB within 1 subframe, for example, $M_{f1}=M_{t1}=1$. In another example, for a relatively large payload size, each uplink transmission resource pool may occupy 2 PRBs and 2 TTIs, for example, $M_{fN}=M_{tN}=2$.

Depending on the payload size, the UE 104 may choose one subregion within the grantless uplink transmission resource pool to transmit the data in the uplink. In this manner, the UE 104 may provide an indication of a payload size to the eNB 108.

In some embodiments, the UE 104 may transmit the uplink data within subregion #1 if the payload size is less than or equal to $X_1$ bits; within subregion #2 if the payload size is within $(X_1, X_2)$ bits; . . . and within subregion #N if the payload size is within $(X_{N-1}, X_N)$ bits. Further, either PUSCH or PUCCH format 2 may be used for the uplink transmission within subregion #1; PUSCH or PUCCH format 3 may be used for the uplink transmission within subregion #2; and PUSCH may be used for the uplink transmission within subregion #N. When transmitting the data, zero padding to $X_1$, $X_2$, or $X_N$ bits may be used to ensure an efficient decoding process at the receiver of the eNB 108.

In an embodiment in which only one subregion is defined, for example, N=1, the UE 104 may randomly select one resource within the grantless uplink transmission resource pool for uplink data transmission.

In some embodiments, the UE 104 may provide a direct indication of the selected MCS and payload size in the uplink transmission. In one option of providing the direct indication in the uplink transmission, the DM-RS can be used to carry the indication of MCS or payload size. In particular, a set of base sequence, cyclic shift and orthogonal cover code for the DM-RS transmission can be fixed or configured by higher layers. Each element within this set corresponds to one combination of MCS and payload size. When the UE 104 transmits the uplink packet, it will choose the corresponding DM-RS for transmission according to the MCS or payload size.

In various embodiments, the indication of MCS or payload size can be transmitted in conjunction with the payload within one transmission resource. In order to ensure a robust reception of the indication of MCS or payload size at the eNB 108, the transmission used to indicate the MCS or payload size may have a lower coding rate then the coding rate used for payload of the MTC transmission and may further have a deterministic MCS. Given that the information bit size of the MCS and payload size indication is typically small, e.g., several bits, a (N, k) block code can be used as a coding scheme rather than TBCC, where N and k indicate the number of codes bits and the number of information bits, respectively. Furthermore, the modulated indication of MCS and payload size can be mapped to the resource elements adjacent to the DM-RS symbol in order to take advantage of best possible channel estimation.

Various embodiments describe repeated transmissions for grantless uplink transmissions. As mentioned above, the UE 104 may randomly select a resource within a resource pool to transmit the data in the uplink. To improve the decoding performance, repeated transmission can be considered for grantless uplink transmission. In particular, the transmission resources used for the initial transmission and repeated transmission may be selected based on time or frequency hopping in order to exploit the benefits of time or frequency diversity.

In some embodiments, the eNB 108 can configure whether repeated transmission can be used by the UE 104 for grantless uplink transmissions. The configuration information can be configured by higher layers, via master information block (MIB), SIB or UE-specific dedicated RRC signaling.

Depending on the channel coding employed, the repeated transmissions can be with the same or different sets of systematic and parity bits generated by the mother code. For example, the repeated transmissions can be transmitted with different redundancy versions (RVs) in the case of turbo coding. For the case of different RVs, the sequence of RVs can be fixed or configured by higher layers. Using different RVs may be more beneficial when there exists a deterministic or pseudo-random pattern (that can be known at the eNB 108) between the initial transmission and subsequent retransmission(s).

Figure 5:
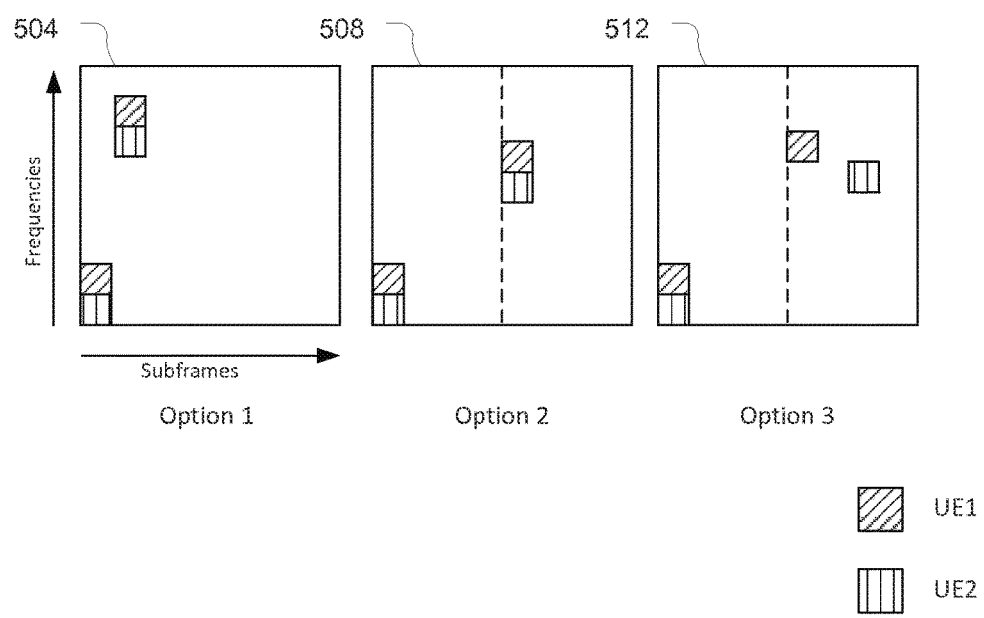
FIG. 5 illustrates repeated transmission schemes within a resource pool in accordance with various embodiments.

FIG. 5 illustrates repeated transmission schemes within a resource pool for grantless uplink transmission in accordance with some embodiments. In particular, FIG. 5 shows a resource pool 504 illustrating a first option for repeated transmission, resource pool 508 illustrating a second option for repeated transmission, and resource pool 512 illustrating a third option for repeated transmission. Each of the resource pools illustrates first and second transmissions to first and second UEs.

The resource pool 504 illustrates uplink packets being transmitted in consecutive subframes within one resource pool. Further, inter-subframe frequency hopping can be employed to exploit the benefits of frequency diversity. More specifically, PUCCH-like or PUSCH-like frequency hopping schemes can be defined for this option. For PUSCH-like frequency hopping schemes, either Type-1 PUSCH hopping based on predefined hopping offset or Type-2 PUSCH hopping according to subband hopping and mirroring mechanism can be adopted.

In one example, the frequency hopping scheme can be designed based on Type-1 PUSCH hopping. Let the frequency resource on which an MTC UE initially transmits the uplink packet be $n_f(0)$, $(0 \leq n_f \leq N_f-1)$. Then, the frequency resource for this UE on the $k^{th}$ repeated transmission, where $(1 \leq k \leq L-1)$, can be given by the following equation, where L is the bundled TTIs for repeated transmission:

$$n_f(k)=[n_f(0)+k\lfloor N_f/L \rfloor] \bmod N_f$$

In some embodiments, a fixed time delay between multiple (re)transmissions for uplink data transmission may be defined. Similarly, inter-subframe frequency hopping may be employed to exploit the benefits of frequency diversity.

In one example, the frequency hopping scheme can be designed based on Type-1 PUSCH hopping. If the fixed delay between multiple (re)transmissions is $\Delta$, then the time and frequency resource index on the $k^{th}$ repeated transmission may be given by:

$$n_t(k)=[n_t(0)+k \cdot \Delta] \bmod N_t, \text{ and}$$

$$n_f(k)=[n_f(0)+k\lfloor N_f/L \rfloor] \bmod N_f$$

where $n_t(0)$, $(0 \leq n_t \leq N_t-1)$ is the time resource when an MTC UE initially transmits the uplink packet.

The resource pool 508 shown in FIG. 5 is divided into two sub-pools and a gap between initial transmissions and repeated transmissions is half of the resource pool in time.

In some embodiments, both time and frequency hopping can be applied for repeated transmission between multiple sub-pools within one resource pool such as that shown in resource pool 508.

In one example, a resource hopping mechanism as defined for physical sidelink discovery channel (PSDCH) in 3GPP TS 36.213 v12.5.0 (Mar. 26, 2015) may be reused for uplink grantless transmission for MTC. This mechanism may allow two or more UEs transmitted in the same time and frequency resource in the first transmission to hop to different time and frequency resources in the second transmission.

In another example, a resource hopping mechanism can be defined as a function of the UE ID. For example, the frequency or subframe used to transmit the retransmission may relate to the frequency or subframe used to transmit the original transmission by some function related to the UE ID.

In another example, a uniformly random resource hopping mechanism may be defined in which the UE randomly and independently selects multiple resources within each resource pool for multiple transmissions of the same uplink packet. This scheme may reduce the resource collision probability for uplink data transmission. However, link level performance degradation may be expected due to the fact that eNB 108 may not perform combining for repeated transmissions.

Some embodiments may adjust DM-RS transmissions to accommodate grantless uplink transmissions. To simplify the design, generation of a base sequence for a DM-RS transmission may be similar to that described in existing LTE specifications. In particular, group and sequence hopping can be configured by higher layers.

In the existing LTE specifications, the cyclic shift (CS) value is generated according to the following equation:

$$n_{CS,\lambda}=(n_{DMRS}^{(1)}+n_{DMRS,\lambda}^{(2)}+n_{PN}(n_s)) \bmod 12,$$

where $n_{DMRS}^{(1)}$ and $n_{DMRS,\lambda}^{(2)}$ are cell-specific parameters, the values of $n_{DMRS}^{(1)}$ is given by Table 5.5.2.1.1-2 in 3GPP TS 36.211 v12.5.0 (Mar. 26, 2015) according to the parameter cyclicShift provided by higher layers, $n_{DMRS,\lambda}^{(2)}$ is given by the cyclic shift for DMRS field in most recent uplink-related DCI as described in 3GPP TS 36.212, and $n_{PN}(n_s)$ is a cell-specific randomized value as defined in 3GPP TS 36.211. However, for grantless uplink transmission, no uplink grant is transmitted by the eNB 108 and, therefore, the UE 104 cannot rely on DCI for $n_{DMRS,\lambda}^{(2)}$. To address this issue, several options can be considered, as follows.

In some embodiments, $n_{DMRS,\lambda}^{(2)}$ can be fixed in the specification or configured by higher layers as a cell-specific parameter for the generation of the CS value. This option can be considered to simplify the design and reduce the complexity at the receiver, for example, without the need for DM-RS blind detection by the eNB 108. In one example, $n_{DMRS,\lambda}^{(2)}$ can be fixed as 0.

In some embodiments, when transmitting the uplink packet, the UE 104 may randomly select $n_{DMRS,\lambda}^{(2)}$ from a predefined set of values, for example, the values as defined in Table 5.5.2.1.1-1 in 3GPP TS 36.211. For this option, the eNB 108 may need to blindly detect the potential DM-RS sequence for proper channel estimation and demodulation. This option may help to improve the detection performance under the co-channel interference scenario when multiple MTC UEs select the same resource for uplink data transmission.

To further improve the performance for channel estimation and time/frequency offset estimation, higher density DM-RS transmission may be considered for grantless uplink transmission.

For repeated transmission, certain options can be considered for the DM-RS transmission. In some embodiments, the UE 104 may always choose the same $n_{DMRS,\lambda}^{(2)}$ for multiple (re)transmissions within one resource pool. This may help to improve the blind detection performance of DM-RS sequence.

In some embodiments, the UE 104 may randomly select $n_{DMRS,\lambda}^{(2)}$ for multiple (re)transmissions within one resource pool. This may help to reduce the collision on DM-RS transmission.

In some embodiments, the UE 104 may apply certain DM-RS CS hopping for multiple (re)transmissions within one resource pool. In one example, $$n_{DMRS,\lambda}^{(2)}(k) = n_{DMRS,\lambda}^{(2)}(0) + k \cdot \Delta_{CS},$$

where $\Delta_{CS}$ is the hopping distance for CS value. In various embodiments, the hopping distance may be fixed or configured by higher layers.

In various embodiments, power control mechanisms may be enhanced for grantless uplink transmission.

Figure 6:
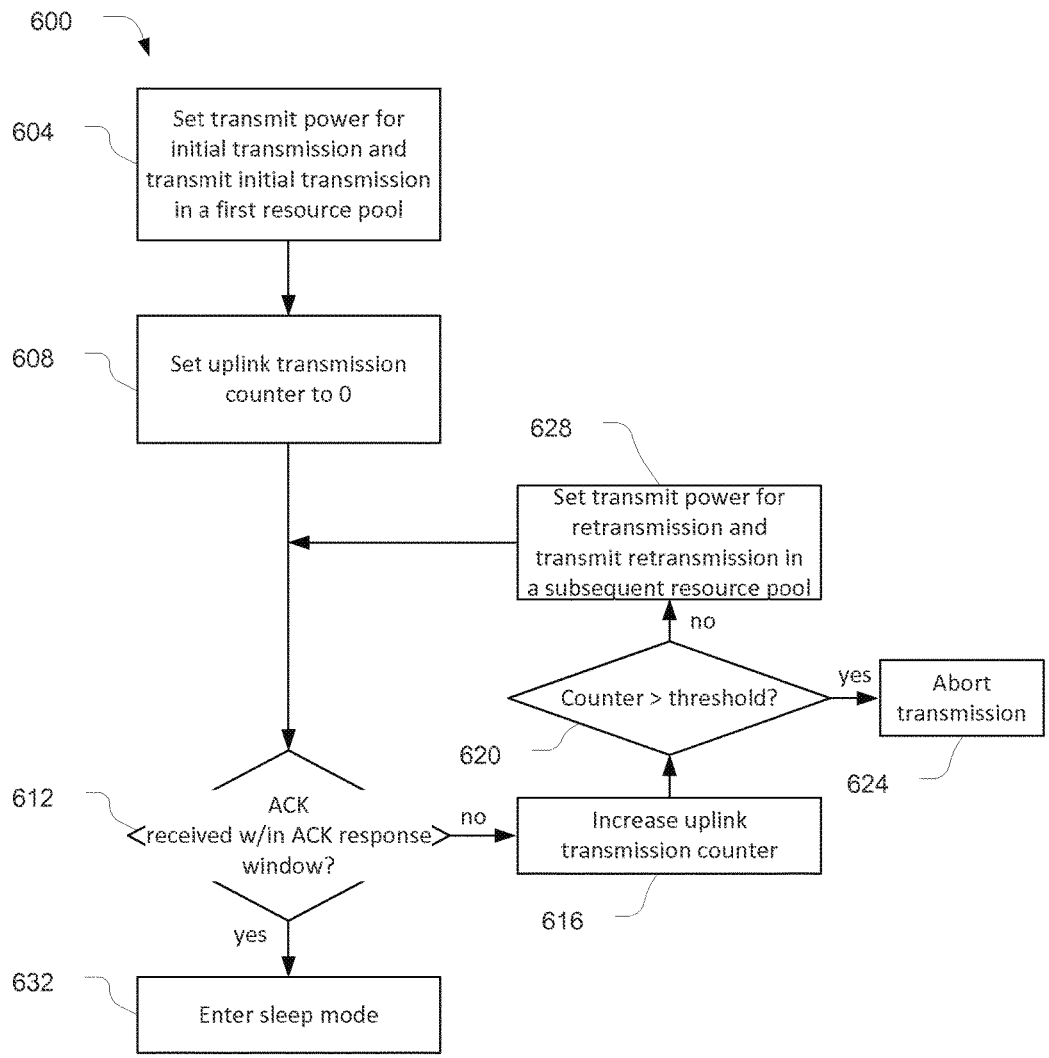
FIG. 6 illustrates a power control operation in accordance with various embodiments.

FIG. 6 illustrates a power control operation 600 in accordance with some embodiments. The operation 600 may include, at 604, setting a transmit power for an initial transmission and transmitting the initial transmission. The transmit power for an initial grantless uplink transmission may be based on an open-loop power control mechanism. For example, the UE 104 may use a transmit power defined as $$P_{PUSCH} = \min\{P_{CMAX}, 10 \log_{10}(M_{PUSCH}) + P_{O\_NOMINAL\_PUSCH} + PL)\},$$

where $P_{CMAX}$ is the configured UE transmit power as defined in TS 36.213; PL is the downlink pathloss estimate calculated in the UE 104 for serving cell in decibels (dB), which is also defined in TS 36.213; $M_{PUSCH}$ is the bandwidth of the PUSCH for grantless uplink transmission expressed in number of resource blocks; and $P_{O\_NOMINAL\_PUSCH}$ is the nominal PUSCH transmit power. The nominal PUSCH transmit power may be given by:

$$P_{O\_NOMINAL\_PUSCH} = P_{O\_TX} + \Delta_{PUSCH},$$

where $P_{O\_TX}$ and $\Delta_{PUSCH}$ can be signaled by higher layers via MIB, SIB or UE-specific RRC signaling. In some embodiments, these two parameters can reuse the existing parameters preambleinitialReceivedTargetPower ($P_{O\_PRE}$) and $\Delta_{PREAMBLE\_Msg3}$ as defined in 3GPP TS 36.213.

The operation 600 may include, at 608, initializing an uplink transmission counter, for example, setting the uplink transmission counter to 0, PUSCH_CL_TX_COUNTER=0.

The operation 600 may include, at 612, determining whether an acknowledgement (ACK) was received within an ACK response window. If no ACK is received within the ACK response window, the operation 600 may proceed to 616 and the UE may increase the uplink transmission counter by one. For example,

PUSCH_CL_TX_COUNTER=PUSCH_CL_TX_COUNTER+1.

The operation 600 may include, at 620, determining whether the transmission counter is greater than a predetermined threshold. If the transmission counter is greater than the predetermined threshold, the operation 600 may abort transmission at 624.

If, at 620, it is determined that the transmission counter is not greater than the predetermined threshold, the operation 600 may advance to setting the transmit power for retransmission and retransmitting the retransmission at 628. The transmit power for retransmission can be given by:

$$P_{O\_NOMINAL\_PUSCH} = P_{O\_TX} + \Delta_{PUSCH} + (\text{PUSCH\_CL\_TX\_COUNTER} - 1) \cdot \Delta_{ramp},$$

where $\Delta_{ramp}$ is the PUSCH power ramping factor, which can be fixed or signalled by higher layers via MIB, SIB or UE-specific RRC signaling. In some embodiments, parameter powerRampingStep for RACH power ramping factor can be reused for $\Delta_{ramp}$. Additionally, the power ramping mechanism can be configurable by the network. For instance, in the case of high interference scenarios, power ramping for subsequent transmissions may adversely affect the performance due to increased interference.

If, at 612, it is determined that the ACK is received within the ACK response window, the operation 600 may advance to entering sleep mode at 632.

Various embodiments describe interference control mechanisms that may be used to facilitate grantless uplink transmissions. In general, the eNB 108 can allocate and semi-statically adjust a size and periodicity of the resource pool allocated for grantless uplink transmissions based on, for example, the current loading condition in the network. However, sufficient amounts of resources may not always be available at the system level for the network to allocate as resource pool(s) for grantless uplink transmissions. In such cases, with contention-based grantless uplink transmission, interference control mechanisms may be considered for efficient operation at the system and link levels, especially when UEs transmit UL packets in multiple resource pools due to, for example, device-originating traffic or retransmissions.

In some embodiments, a UE-grouping mechanism based on a UE-specific transmission period and offset can be configured. For periodically occurring resource pools, the UE-specific period of the eligible resource pools may be an integer multiple of the system-level period. Recall, from FIG. 2, that the UE 104 may randomly select the first resource pool for transmitting the first transmission and, if it is determined that an ACK is not received within the ACK response window at 212, may choose the next resource pool at 220. In choosing the next resource pool, some embodiments may provide that the UE 104 is allowed to transmit on alternately occurring resource pools, for example, every other resource pool. Similar mechanisms may be applied to repeated transmission embodiments as well.

In some embodiments, the interference control may be provided by configuring fixed probabilistic transmissions. According to this mechanism, for each instance of a resource pool period, the UE 104 may transmit the data with a fixed probability from, for example, {0.25, 0.5, 0.75, 1}. Alternatively, the UE 104 may randomly choose one resource pool among L consecutive resource pools (which, for the case of retransmission, may be the same as having a fixed back-off window). This can apply for both initial transmission and retransmissions.

In some embodiments, adaptive probabilistic transmissions may be used to avoid congestion. Specifically, a nominal transmission probability, for example, 0.5, may be configured by common or dedicated RRC signaling and the probability of transmission can be increased or decreased about the nominal value depending on, for example: (i) an interference situation, (ii) whether the UE 104 transmitted or not during the previous instance of the resource pool, or (iii) an appropriate combination of both (i) and (ii).

In some embodiments, the interference situation may be determined, for instance, based on a binary feedback from the eNB 108. For example, the feedback from the eNB 108 may indicate whether a resource pool is overloaded or is below its capacity. Based on this information, the UE 104 may increase or decrease the transmission probability. The feedback from the eNB 108 may be transmitted using Layer 1 signaling using the physical downlink control channel that is transmitted maintaining a pre-defined timing relationship with respect to the last subframe of the resource pool. The feedback may be transmitted using a downlink control channel in a common search space with CRC scrambled with a non-UE-specific connectionless radio network temporary identifier (CL-RNTI) value.

In various embodiments, the adaptation of the transmission probability can be based on additive increase multiplicative decrease (AIMD) or additive increase additive decrease (AIAD) mechanisms, wherein, for both the options, the desired increase/decrease factors can be configured by the network based on the loading situation.

The adaptive probabilistic transmission can be used as a back-off mechanism for interference control based on whether the UE 104 transmitted in the previous resource pool period or not. Specifically, if the UE 104 transmitted in the previous period of the eligible resource pool, the UE 104 may decrease its transmission probability by a certain additive factor (per AIAD) or multiplicative factor (per AIMD). On the other hand, if the UE 104 did not transmit during the previous period of the eligible resource pool, the UE 104 may increase the transmission probability by an additive/multiplicative factor.

In some embodiments, transmission probability operations (for example, instructions to decrease/increase the transmission probability or application of probabilistic transmission itself) may be applied by the UE 104 for both initial and retransmissions. However, in some embodiments it may be more suitable to apply these operations only for retransmissions and in case of heavy loading scenarios. This may be especially true if physical and media access control (MAC) layer latency reduction is considered as a primary design goal.

In some embodiments, the transmission probability operations may be applied by the UE 104 independently for initial and retransmissions. For instance, in some embodiments initial transmissions may be transmitted always with probability of 1, while a fixed or adaptive probabilistic transmission operation may be applied for retransmissions. In another example, different transmission probability values and increment/decrement factors can be configured or pre-defined for the case of initial transmission or subsequent retransmissions.

In some embodiments, a fixed or adaptive probabilistic transmission operations may be applied as an alternative to, or in an appropriate combination with, other back-off mechanisms based on fixed or random back-off windows.

Figure 7:
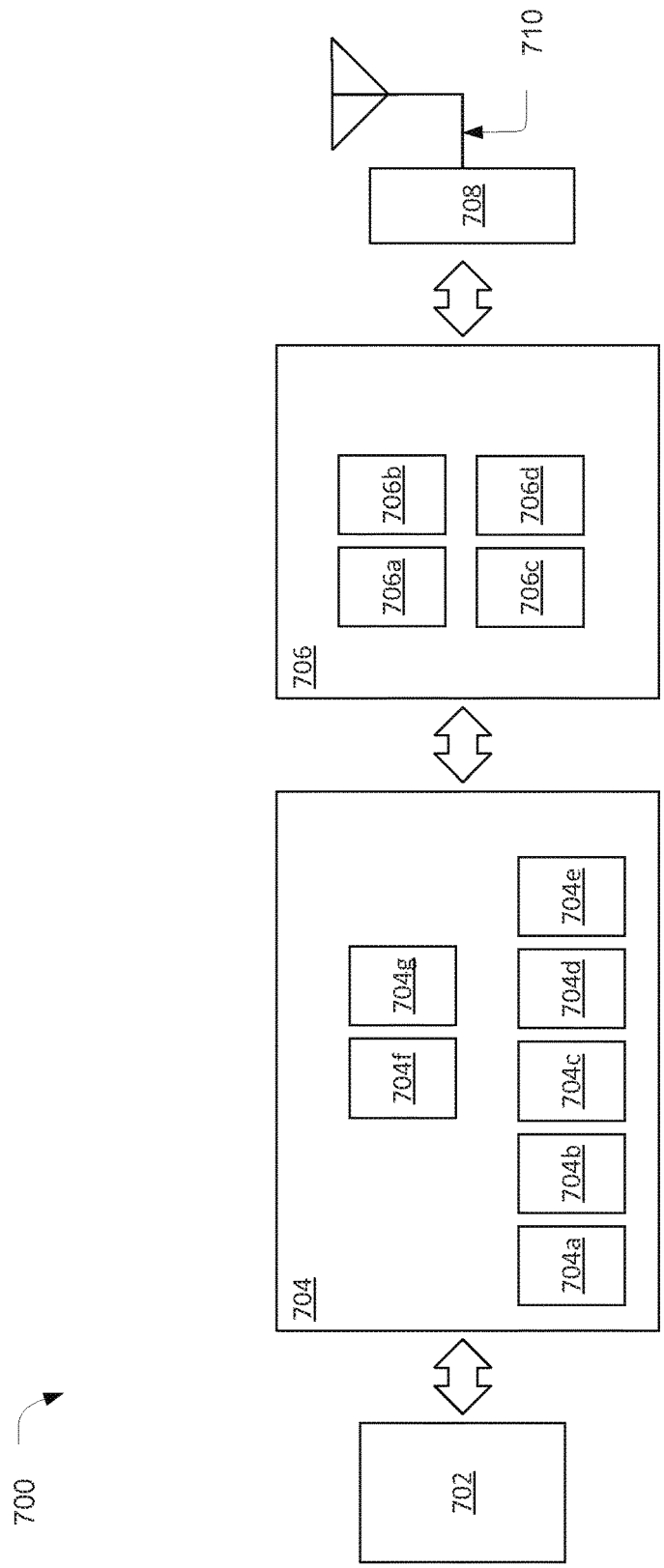
FIG. 7 illustrates an example system that may be used to practice various embodiments described herein.

Embodiments described herein may be implemented into a system using any suitably configured hardware and/or software. FIG. 7 illustrates, for one embodiment, example components of a device 700, which may be a UE (for example, UE 104) or an eNB (for example, eNB 108). In some embodiments, the device 700 may include application circuitry 702, baseband circuitry 704, radio frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband circuity 704 may interface with the application circuitry 702 for generation and processing of the baseband signals and for controlling operations of the RF circuitry 706. For example, in some embodiments, the baseband circuitry 704 may include a second generation (2G) baseband processor 704*a*, third generation (3G) baseband processor 704*b*, fourth generation (4G) baseband processor 704*c*, fifth generation baseband processor 704*d*, and/or other baseband processor(s) for other existing generations, generations in development or to be developed in the future (e.g., 6G, etc.).

The baseband circuitry 704 (e.g., one or more of baseband processors 704*a-e*) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), MAC, radio link control (RLC), packet data convergence protocol (PDCP), and/or radio resource control (RRC) elements. A central processing unit (CPU) 704*e* of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704*f*. The audio DSP(s) 704*f* may include elements for compression/decompression and echo cancellation and may include other suitable processing elements in other embodiments.

The baseband circuitry 704 may further include memory/storage 704g. The memory/storage 704g may be used to load and store data and/or instructions for operations performed by the processors of the baseband circuitry 704. Memory/storage for one embodiment may include any combination of suitable volatile memory and/or non-volatile memory. The memory/storage 704g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 704g may be shared among the various processors or dedicated to particular processors. In some embodiments, the memory/storage 704g may be external to the baseband circuitry 704 and, for example, shared with other circuitry such as, but not limited to, application circuitry 702 or RF circuitry 706.

Components of the baseband circuitry 704 may be suitably combined in a single chip, a single chipset, or disposed on a same circuit board in some embodiments. In some embodiments, some or all of the constituent components of the baseband circuitry 704 and the application circuitry 702 may be implemented together, such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (E-UTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

In embodiments in which the device 700 is a UE, for example, UE 104, the baseband circuitry 704 may perform, for example, operations such as, but not limited to, generating and transmitting grantless uplink transmissions as described herein. In some embodiments, the baseband circuitry 704 may encompass some or all of the communication circuitry 116 and control circuitry 120 described above with respect to FIG. 1.

In embodiments in which the device is an eNB, the baseband circuitry 704 may perform, for example, the configuration of MTC UEs and resource pools and receipt and processing of grantless uplink tranmissions. In some embodiments, the baseband circuitry 704 may encompass some or all of communication circuitry 128 and control circuitry 140 described above with respect to FIG. 1.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path that may include circuitry to down-convert RF signals received from the FEM circuitry 708 and provide baseband signals to the baseband circuitry 704. RF circuitry 706 may also include a transmit signal path that may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 depending on the desired output frequency. In some embodiments, a divider control input (e.g., N) may be determined from a look-up table based on a channel indicated by the application circuitry 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

In some embodiments, the RF circuitry 706 may encompass our include parts of radio transceiver 122 or transceiver 132 as described above with respect to FIG. 1.

FEM circuitry 708 may include a receive signal path that may include circuitry configured to operate on RF signals received from one or more antennas 710, amplify the received signals and provide the amplified versions of the received signals to the RF circuitry 706 for further processing. FEM circuitry 708 may also include a transmit signal path that may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the device 700 may include additional elements such as, for example, display (for example, a touchscreen display), camera, sensor, and/or input/output (I/O) interface.

Some non-limiting examples are provided below.

Example 1 includes one or more computer-readable media having instructions that, when executed, cause a user equipment (UE) to: acquire downlink synchronization and system information from an evolved node B (eNB); identify, based on the downlink synchronization and system information, a resource pool that is provided in an uplink part of a frame for uplink transmissions, the resource pool being non-UE-specific; randomly select one or more transmission resources of the resource pool; and transmit machine-type communication (MTC) data in the one or more transmission resources.

Example 2 includes the one or more computer-readable media of example 1, wherein the instructions, when executed, further cause the UE to: transmit an activation signal to the eNB to activate the resource pool for periodic uplink transmission; and detect a response to the activation signal that indicates activation of the resource pool.

Example 3 includes the one or more computer-readable media of example 2, wherein the instructions, when executed, further cause the UE to: transmit the activation signal using a scheduling request (SR).

Example 4 includes the one or more computer-readable media of example 3, wherein the activation signal comprises a data or reference signal portion of a physical uplink control channel (PUCCH) format 1 transmission modulated by a predetermined signature.

Example 5 includes the one or more computer-readable media of example 2, wherein the instructions, when executed, further cause the UE to: transmit, to the eNB, a deactivation signal to deactivate the resource allocation for the periodic uplink transmission.

Example 6 includes the one or more computer-readable media of any one of examples 1-5, wherein the instructions, when executed, cause the UE to: construct a packet that includes a header, a payload that includes the MTC data, and a cyclic redundancy check (CRC); and transmit the packet in the one or more transmission resources.

Example 7 includes the one or more computer-readable media of example 6, wherein the CRC includes 8, 16, or 24 parity check bits calculated based on the payload and the header and appended to the payload.

Example 8 includes the one or more computer-readable media of example 6, wherein the header includes an identifier of the UE.

Example 9 includes the one or more computer-readable media of example 8, wherein the identifier is an international mobile subscriber identity (IMSI) or a cell radio network temporary identifier (C-RNTI).

Example 10 includes the one or more computer-readable media of example 6, wherein the one or more transmission resources comprises one or more available resource elements (REs) and the instructions, when executed, cause the UE to: encode the packet using a tail-biting convolutional code; and utilize rate matching, after encoding the packet, to fill out the one or more available REs.

Example 11 includes the one or more computer-readable media of example 10, wherein the instructions, when executed, cause the UE to: scramble, after encoding and rate matching, the packet using a scrambling seed for physical uplink shared channel (PUSCH) transmission, wherein the scrambling seed is based on cell identifier, slot or subframe index, lowest physical resource block (PRB) index on which the UE transmits the MTC data, or a radio network temporary identifier (RNTI) of the UE.

Example 12 includes the one or more computer-readable media of example 11, wherein the scrambling seed, $c_{init}$, is given by one of:

$$c_{init} = n_{RNTI} \cdot 2^{14} + q \cdot 2^{13} + \left\lfloor \frac{n_s}{2} \right\rfloor \cdot 2^9 + N_{ID}^{cell};$$

$$c_{init} = N_{ID}^{cell};$$

$$c_{init} = f(N_{ID}^{cell}, n_s);$$

$$c_{init} = \left\lfloor \frac{n_s}{2} \right\rfloor \cdot 2^9 + N_{ID}^{cell}; \text{ or}$$

$$c_{init} = n_{RNTI} \cdot 2^{14} + \left\lfloor \frac{n_s}{2} \right\rfloor \cdot 2^9 + N_{ID}^{cell},$$

wherein $N_{RNTI}$ is the RNTI, q is a codeword index, $N_{ID}^{cell}$ is a cell ID, and $n_s$ is a slot index.

Example 13 includes the one or more computer-readable media of example 11 or 12, wherein the scrambling seed is based on the RNTI and the RNTI is fixed or configured by a network.

Example 14 includes the one or more computer-readable media of example 11 or 12, wherein the scrambling seed is based on the RNTI and the RNTI is associated with the one or more transmission resources.

Example 15 includes an apparatus comprising: one or more storage media having instructions; and one or more processors coupled with the one or more storage media to execute the instructions to cause the apparatus to: select one or more transmission resources of a resource pool that is provided in an uplink part of a frame for grantless uplink transmissions, the resource pool being non-UE-specific; construct an uplink transmission to transmit machine-type communication (MTC) data in the one or more transmission resources.

Example 16 includes the apparatus of example 15, wherein the one or more processors are to execute the instructions to cause the apparatus to: process a configuration command received from an evolved node B (eNB) that indicates a repeated transmission can be used by the UE for transmission of the MTC data.

Example 17 includes the apparatus of any one of examples 15-16, wherein the one or more transmission resources are first transmission resources and the one or more processors are to execute the instructions to cause the apparatus to: cause a first transmission of the MTC data on the first transmission resources; and cause a second transmission of the MTC data on second transmission resources, wherein the first and second transmission resources are randomly selected or selected based on time or frequency hopping.

Example 18 includes the apparatus of any one of examples example 15-17, wherein the first and second transmission resources are selected utilizing resource hopping based on an identity of the UE.

Example 19 includes the apparatus of any one of examples 15-18, wherein the first and second transmissions are in respective first and second subframes that are consecutive subframes or separated by a fixed time delay.

Example 20 includes the apparatus of example 19, wherein the resource pool is divided into first and second sub-pools, the first transmission is transmitted in the first sub-pool, and the second transmission is transmitted in the second sub-pool.

Example 21 includes the apparatus of any one of examples 15-20, wherein the first transmission uses a first redundancy version (RV) of turbo coding and the second transmission uses a second redundancy version (RV) of turbo coding, wherein the first RV is different from the second RV.

Example 22 includes the apparatus any one of examples 15-21, wherein the one or more processors execute the instructions to cause the apparatus to: determine a plurality of cell-parameters; generate a cyclic shift value based on the plurality of cell-specific parameters; and generate a demodulation reference signal (DM-RS) based on the cyclic shift value.

Example 23 includes the apparatus of example 22, wherein a first cell-specific parameter of the plurality of cell-specific parameters is selected from a list of predetermined values based on a cyclic shift value parameter provided by higher layers, and a second cell-specific parameter of the plurality of cell-specific parameters is fixed in a specification, configured by higher layers, or selected from the list of predetermined values.

Example 24 includes the apparatus of example 23, wherein the second cell-specific parameter is used for an initial transmission of the MTC data within the resource pool and a different cell-specific parameter is used for a repeated transmission of the MTC data.

Example 25 includes the apparatus of example 24, wherein the different cell-specific parameter is separated from the second cell-specific parameter by a hopping distance.

Example 26 includes one or more computer-readable media having instructions that, when executed, cause a user equipment (UE) to: acquire downlink synchronization and system information from an evolved node B (eNB); identify, based on the downlink synchronization and system information, a resource pool that is provided in an uplink part of a frame, the resource pool being non-UE-specific; select a portion of the resource pool for transmission of a machine-type communication (MTC) transmission; and provide an indication of a payload size or modulation coding scheme (MCS) of the MTC transmission.

Example 27 includes the one or more computer-readable media of example 26, wherein the resource pool includes a plurality of portions, with individual portions of the plurality of portions corresponding to individual payload ranges and the UE is to provide the indication through selection of the portion.

Example 28 includes the one or more computer-readable media of example 26, wherein the resource pool includes a plurality of portions, with individual portions of the plurality of portions corresponding to individual MCSs and the UE is to provide the indication through selection of the portion.

Example 29 includes the one or more computer-readable media of any one of examples 26-28, wherein the resource pool includes a plurality of portions multiplexed using time or frequency division multiplexing.

Example 30 includes the one or more computer-readable media of example 26, wherein the UE is to provide the indication through selection of a demodulation reference signal (DM-RS).

Example 31 includes the one or more computer-readable media of example 26, wherein the UE is to provide the indication through construction of a transmission to provide a direct indication of the MCS or payload size, wherein the transmission has a coding rate lower than a coding rate used for a payload of the MTC transmission.

Example 32 includes the one or more computer-readable media of example 31, wherein the transmission is mapped to a resource element adjacent to resource elements used to transmit a demodulation reference signal (DM-RS).

Example 33 includes a method comprising: selecting one or more transmission resources of a resource pool that is provided in an uplink part of a frame for uplink transmission, the resource pool being non-UE-specific; setting a first transmit power for an initial transmission of machine-type communication (MTC) data; transmitting the initial transmission in the resource pool with the first transmit power; initializing an uplink transmission counter; determining an acknowledgment to the initial transmission is not received within an acknowledgment response window; setting a second transmit power for a subsequent transmission of the MTC data; and transmitting the subsequent transmission with the second transmit power.

Example 34 includes the method of example 33, wherein the setting of the first transmit power is based on a nominal physical uplink shared channel transmit power.

Example 35 includes the method of any one of examples 33-34, further comprising: comparing the uplink transmission counter to a predetermined threshold; and transmitting the subsequent transmission based on said comparing.

Example 36 includes the method of any one of examples 33-35, wherein setting the second transmit power is based on the first transmit power and a power ramping factor.

Example 37 includes the method of any one of examples 33-36, wherein setting the second transmit power is based on the uplink transmission counter.

Example 38 includes the method of any one of examples 33-37, wherein the resource pool is a first resource pool and the subsequent transmission is transmitted in a second resource pool.

Example 39 includes the method of example 38, further comprising:
selecting the first and second resource pools based on a user equipment specific period of eligible resource pools, wherein the UE-specific period of eligible resource pools is an integer multiple of a system level period of resource pools.

Example 40 includes the method of example 38, further comprising: selecting the first and second resource pools from a plurality of eligible resource pools based on fixed probabilities associated with individual resource pools of the plurality of eligible resource pools.

Example 41 includes the method of example 38, further comprising:
randomly selecting the second resource pool from a plurality of eligible resource pools.

Example 42 includes the method of example 38, further comprising: selecting the first and second resource pools based on a transmission probabilities associated with the first and second resource pools, respectively.

Example 43 includes the method of example 42, further comprising: adjusting the transmission probability based on interference feedback received from an eNB or an interval elapsed from transmission of the initial transmission.

Example 44 includes the method of example 42, wherein the first and second resource pools are associated with different transmission probabilities.

Example 45 includes the method for wireless communications, including: preparing, by a UE, MTC data for transmission to an eNB; and providing, by the UE, the MTC data to the eNB via a connectionless uplink transmission.

Example 46 includes the method of example 45, further comprising: transmitting information to the eNB to cause activation of uplink connectionless transmission capability prior to providing the MTC data to the eNB.

Example 47 includes the method of example 46, further comprising: transmitting information to the eNB to cause deactivation of uplink connectionless transmission capability after providing the MTC data to the eNB.

Example 48 includes the method of any one of examples 45-47, further comprising: receiving a signal, from the eNB, representative of a subregion of a connectionless uplink transmission resource pool, wherein the providing the MTC data to the eNB via the connectionless uplink transmission involves using the sub-region.

Example 49 includes the method of example 48, the subregion is one of multiple subregions, each corresponding to a transmission with a specific payload size and MCS.

Example 50 includes the method of example 48 or 49, wherein the signal is provided in a SIB or via RRC signaling.

Example 51 includes the method of any one of examples 45-49, further comprising: including, in the uplink transmission, an indication of MCS and payload size.

Example 52 includes the method of example 51, wherein the indication of MCS and payload size is a DM-RS.

Example 53 includes the method of example 51, wherein the indication of MCS and payload size is transmitted in conjunction with a payload within one transmission resource.

Example 54 includes an apparatus comprising circuitry to perform any one of methods 33-53.

Example 55 includes one or more computer-readable media having instructions that, when executed, cause and apparatus to perform any one of methods 33-53.

Example 56 includes an apparatus comprising means to perform any one of methods 33-53.

Example 57 includes in enhanced node base station (eNB) comprising: receiver circuitry to receive MTC data from a UE via a connection-less uplink transmission; and control circuitry to process the received MTC data.

Example 58 includes the eNB of example 57, wherein the receiver circuitry is to receive information from the UE to cause activation of uplink connection-less transmission capability of the UE prior to the UE providing the MTC data to the eNB.

Example 59 includes the eNB of example 58, wherein the receiver circuitry is to receive information from the UE to cause deactivation of uplink connection-less transmission capability of the UE after the UE provides the MTC data to the eNB.

Example 60 includes the eNB of any one of examples 57-59, wherein the receiver circuitry is to receive, as part of receipt of the MTC data via the connection-less uplink transmission, a packet including a header, payload and a CRC, appended to the payload, that includes 8, 16, or 24 bits calculable based on the payload and/or header.

Example 61 includes the eNB of any one of examples 57-60, wherein the receiver circuitry is to decode, as part of receipt of the MTC data via the connection-less uplink transmission, the MTC data in accordance with TBCC or TC used for channel coding.

Example 62 includes the eNB of any one of examples 57-61, further comprising: transmitter circuitry to transmit a signal, to the UE, representative of a subregion of a connectionless uplink transmission resource pool, wherein the UE is to use the subregion to provide the MTC data to the eNB via the connection-less uplink transmission.

Example 63 includes the eNB of example 62, wherein the subregion is one of multiple subregions, each corresponding to a transmission with a specific payload size and MCS.

Example 64 includes the eNB of any one of examples 62-63, wherein the signal is provided in an SIB or via RRC signaling.

Example 65 includes the eNB of any one of examples 57-64, wherein the UE is to perform repeated transmission for connectionless uplink transmission.

Example 66 includes the eNB of example 65, further comprising: transmitter circuitry to transmit information, to the UE via MIB, SIB or UE specific dedicated RRC signaling, about whether repeated transmission is to be used.

Example 67 includes the eNB of example 65 or 66, wherein a redundancy version (RV) pattern for repeated transmission is predefined or configured by the eNB.

Example 68 includes the eNB of any one of example 65-67, wherein uplink packets are transmitted in consecutive subframes within a subregion or resource pool.

Example 69 includes the eNB of any one of examples 65-68, wherein inter-subframe frequency hopping is used.

Example 70 includes the eNB of any one of examples 65-69, wherein the receiver circuitry is to identify a fixed time delay used by the UE between multiple (re)transmissions for uplink data transmission.

Example 71 includes the eNB of any one of example 65-70, wherein both time and frequency hopping is applied for repeated transmission between multiple subpools within one resource pool or subregion.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. One or more non-transitory computer-readable media having instructions that, when executed, cause a user equipment (UE) to:
   acquire downlink synchronization and system information from an evolved node B (eNB);
   identify, based on the downlink synchronization and system information, a resource pool that is provided in an uplink part of a frame for uplink transmissions, the resource pool being non-UE-specific;
   transmit an activation signal to the eNB to activate the resource pool for periodic uplink transmission;
   detect a response to the activation signal that indicates activation of the resource pool;
   randomly select one or more transmission resources of the resource pool; and
   transmit machine-type communication (MTC) data in the one or more transmission resources.

2. The one or more non-transitory computer-readable media of claim 1, wherein the instructions, when executed, further cause the UE to:
   transmit the activation signal using a scheduling request (SR).

3. The one or more non-transitory computer-readable media of claim 2, wherein the activation signal comprises a data or reference signal portion of a physical uplink control channel (PUCCH) format 1 transmission modulated by a predetermined signature.

4. The one or more non-transitory computer-readable media of claim 1, wherein the instructions, when executed, further cause the UE to:
   transmit, to the eNB, a deactivation signal to deactivate a resource allocation for the periodic uplink transmission.

5. The one or more non-transitory computer-readable media of claim 1, wherein the instructions, when executed, cause the UE to:
   construct a packet that includes a header, a payload that includes the MTC data, and a cyclic redundancy check (CRC); and
   transmit the packet in the one or more transmission resources.

6. The one or more non-transitory computer-readable media of claim 5, wherein the CRC includes 8, 16, or 24 parity check bits calculated based on the payload and the header and appended to the payload.

7. The one or more non-transitory computer-readable media of claim 5, wherein the header includes an identifier of the UE.

8. The one or more non-transitory computer-readable media of claim 7, wherein the identifier is an international mobile subscriber identity (IMSI) or a cell radio network temporary identifier (C-RNTI).

9. One or more non-transitory, computer-readable media having instructions that, when executed, cause a user equipment (UE) to:
   acquire downlink synchronization and system information from an evolved node B (eNB);
   identify, based on the downlink synchronization and system information, a resource pool that is provided in an uplink part of the frame for uplink transmissions, the resource pool being non-UE-specific;
   randomly select one or more transmission resources of the resource pool; and
   transmit machine-type communication (MTC) data in the one or more transmission resources, wherein the one or more transmission resources comprises one or more available resource elements (REs) and the instructions, when executed, cause the UE to:
   encode a packet using a tail-biting convolutional code; and
   utilize rate matching, after encoding the packet, to fill out the one or more available REs.

10. The one or more non-transitory computer-readable media of claim 9, wherein the instructions, when executed, cause the UE to:
    scramble, after encoding and rate matching, the packet using a scrambling seed for physical uplink shared channel (PUSCH) transmission, wherein the scrambling seed is based on cell identifier, slot or subframe index, lowest physical resource block (PRB) index on which the UE transmits the MTC data, or a radio network temporary identifier (RNTI) of the UE.

11. The one or more non-transitory computer-readable media of claim 10, wherein the scrambling seed, $c_{init}$, is given by one of:

$$c_{init} = n_{RNTI} \cdot 2^{14} + q \cdot 2^{13} + \left\lfloor \frac{n_s}{2} \right\rfloor \cdot 2^9 + N_{ID}^{cell};$$

$$c_{init} = N_{ID}^{cell};$$

$$c_{init} = f(N_{ID}^{cell}, n_s);$$

-continued $$c_{init} = \left\lfloor \frac{n_s}{2} \right\rfloor \cdot 2^9 + N_{ID}^{cell}; \text{ or}$$

$$c_{init} = n_{RNTI} \cdot 2^{14} + \left\lfloor \frac{n_s}{2} \right\rfloor \cdot 2^9 + N_{ID}^{cell},$$

wherein $n_{RNTI}$ is the RNTI, q is a codeword index, $N_{ID}^{cell}$ is a cell ID, and $n_s$ is a slot index.

12. The one or more non-transitory computer-readable media of claim 10, wherein the scrambling seed is based on the RNTI and the RNTI is fixed or configured by a network.

13. The one or more non-transitory computer-readable media of claim 10, wherein the scrambling seed is based on the RNTI and the RNTI is associated with the one or more transmission resources.

14. An apparatus comprising:
one or more storage media having instructions; and
one or more processors coupled with the one or more storage media to execute the instructions to cause the apparatus to:
select one or more transmission resources of a resource pool that is provided in an uplink part of a frame for grantless uplink transmissions, the resource pool being non-UE-specific; and
construct an uplink transmission to transmit machine-type communication (MTC) data in the one or more transmission resources.

15. The apparatus of claim 14, wherein the one or more processors are to execute the instructions to cause the apparatus to:
process a configuration command received from an evolved node B (eNB) that indicates a repeated transmission can be used by the UE for transmission of the MTC data.

16. The apparatus of claim 14, wherein the one or more transmission resources are first transmission resources and the one or more processors are to execute the instructions to cause the apparatus to:
cause a first transmission of the MTC data on the first transmission resources; and
cause a second transmission of the MTC data on second transmission resources, wherein the first and second transmission resources are randomly selected or selected based on time or frequency hopping.

17. The apparatus of claim 16, wherein the first and second transmission resources are selected utilizing resource hopping based on an identity of the UE.

18. The apparatus of claim 16, wherein the first and second transmission resources are in respective first and second subframes that are consecutive subframes or separated by a fixed time delay.

19. The apparatus of claim 18, wherein the resource pool is divided into first and second sub-pools, a first transmission is transmitted in the first sub-pool, and a second transmission is transmitted in the second sub-pool.

20. The apparatus of claim 14, wherein a first transmission uses a first redundancy version (RV) of turbo coding and a second transmission uses a second redundancy version (RV) of turbo coding, wherein the first RV is different from the second RV.

21. An apparatus comprising:
one or more storage media having instructions; and
one or more processors coupled with the one or more storage media to execute the instructions to cause the apparatus to:
select one or more transmission resources of a resource pool that is provided in an uplink part of a frame for grantless uplink transmissions, the resource pool being non-UE-specific; and
construct an uplink transmission to transmit machine-type communication (MTC) data in the one or more transmission resources, wherein the one or more processors execute the instructions to cause the apparatus to:
determine a plurality of cell-specific parameters;
generate a cyclic shift value based on the plurality of cell-specific parameters; and
generate a demodulation reference signal (DM-RS) based on the cyclic shift value.

22. The apparatus of claim 21, wherein a first cell-specific parameter of the plurality of cell-specific parameters is selected from a list of predetermined values based on a cyclic shift value parameter provided by higher layers, and a second cell-specific parameter of the plurality of cell-specific parameters is fixed in a specification, configured by higher layers, or selected from the list of predetermined values.

23. The apparatus of claim 22, wherein the second cell-specific parameter is used for an initial transmission of the MTC data within the resource pool and a different cell-specific parameter is used for a repeated transmission of the MTC data.

24. The apparatus of claim 23, wherein the different cell-specific parameter is separated from the second cell-specific parameter by a hopping distance.

* * * * *